United States Patent [19]
Magel et al.

[11] Patent Number: 5,701,372
[45] Date of Patent: Dec. 23, 1997

[54] HYBRID ARCHITECTURE FOR INTEGRATED OPTIC SWITCHABLE TIME DELAY LINES AND METHOD OF FABRICATING SAME

[75] Inventors: Gregory A. Magel, Dallas, Tex.; Robert M. Boysel, Hopewell Junction, N.Y.

[73] Assignee: Texas Instruments Incorporated, Dallas, Tex.

[21] Appl. No.: 735,293

[22] Filed: Oct. 22, 1996

[51] Int. Cl.$^6$ .................................................. G02B 6/28
[52] U.S. Cl. .................. 385/24; 385/14; 385/15; 385/16; 385/31; 385/32; 385/49; 385/129; 385/130
[58] Field of Search ............................. 385/14, 15, 16, 385/17, 22, 24, 31, 32, 39, 49, 50, 129, 130, 131, 132

[56] References Cited

U.S. PATENT DOCUMENTS

| | | | |
|---|---|---|---|
| 4,904,036 | 2/1990 | Blonder | 385/14 X |
| 5,071,213 | 12/1991 | Chan | 385/52 |
| 5,103,333 | 4/1992 | Koai | 359/140 |
| 5,222,162 | 6/1993 | Yab et al. | 385/14 |
| 5,233,453 | 8/1993 | Sivarajan et al. | 385/14 X |
| 5,271,074 | 12/1993 | Tocci | 385/16 |
| 5,278,925 | 1/1994 | Boysel et al. | 385/14 |
| 5,309,537 | 5/1994 | Chun et al. | 385/59 |
| 5,351,320 | 9/1994 | Kanetake et al. | 385/8 |
| 5,367,586 | 11/1994 | Glance et al. | 385/24 |
| 5,414,548 | 5/1995 | Tachikawa et al. | 359/130 |
| 5,450,431 | 9/1995 | Glance et al. | 372/50 |
| 5,537,498 | 7/1996 | Bausman et al. | 385/24 |
| 5,542,010 | 7/1996 | Glance et al. | 385/14 |
| 5,647,032 | 7/1997 | Jutamulia | 385/14 |

OTHER PUBLICATIONS

Watson, et al., "A Low-Voltage 8 × 8 Ti:LiNbO$_3$ Switch with a Dilated-Benes Architecture", IEEE Journal of Lght Wave Technology, vol. 8, No. 5, May 1990, pp. 794–800.

C.M. Schroeder, "Accurate Silicon Spacer Chips for an Optical–Fiber Cable Connector", The Bell System Technical Journal, Jan. 1978, pp. 91–97.

Sugita, et al., "Optical Fiber Coupling to Single–Mode Silica–Based Planar Lightwave Circuits with Fiber–Guiding Grooves", Fiber and Integrated Optics, vol. 12, pp. 347, 349, 351 and 353.

Hida, et al., "10 m long silica–based waveguide with a loss of 1.7 dB/m", IthC6–1, NTT Opto–electronics Laboratories, pp. 49–51.

Murphy, "Fiber Attachment for Guided Wave Devices", Journal of Light Wave Technology, vol. 6, No. 6, IEEE Journal, Jun. 1988, pp. 862–871.

Suzuki, et al., "Large–Scale and High–Density Planar Lightwave Circuits with High–GeO$_2$–Doped silica Waveguides", Electronic Letters, vol. 28, No. 20, Sep. 1992, pp. 18631864.

Murphy, et al., "Uniform 8 × 8 Lithium Niobate Switch Arrays", IEEE Journal of Lightwave Technology, vol. 13, No. 5, May 1995, pp. 967–970.

*Primary Examiner*—Brian Healy
*Attorney, Agent, or Firm*—Bret J. Petersen; James Kesterson; Richard Donaldson

[57] ABSTRACT

The present invention provides a method and a circuit architecture whereby a time delay for optical signals in an integrated optical circuit is implemented in a hybrid configuration. For example, a hybrid time delay circuit could be implemented with a three chip set composed of a switch chip 34 placed between two delay chips 36,38. The delay chips may include one or more delay loops 44 and preferably an associated bypass loop for each delay loop 42. The switch chip contains an optical switch 20 for each delay loop on the delay chips and may contain switch control circuitry or an interface to external switch control circuitry.

16 Claims, 3 Drawing Sheets

HYBRID ARCHITECTURE FOR INTEGRATED OPTIC SWITCHABLE TIME DELAY LINES AND METHOD OF FABRICATING SAME

FIELD OF THE INVENTION

The invention relates to integrated optic devices, circuits, and microwave phased array antennas and more particularly, to a hybrid integrated optical time delay circuit which separates the switch functions and delay functions of an optical time delay line network which could be used for a phased array radar system or any other system needing an optical delay network such as data communications.

BACKGROUND OF THE INVENTION

It is often necessary in an optical circuit design to implement a delay in a particular signal path. For example, a delay line network can be used to steer the radar beam in a phased array radar system. This type of radar system utilizes an antenna which is composed of an array of antenna elements that can receive and/or send radio frequency (RF) energy. The principle of operation is that an antenna beam points in a direction normal to its phase front. With phased arrays, the phase front is adjusted to steer the beam by individual control of the phase of excitation for each radiating element. One method to control of the phase of the elements requires a controlled delay between excitation of successive elements in the array. An embodiment of the present invention teaches a method and optical circuit layout to achieve delays of this type using delays of an optical signal in an integrated circuit waveguide.

Optical time delays have several advantages over electrical time delay networks. For example, optical time delays provide a true time delay that is independent of the signal that is modulated onto the optical carrier. Optical time delay networks will exhibit a loss that is approximately independent of the selected delay time and signal frequency. Also, the optical delays are relatively immune to phase nonlinearity caused by multiple reflections and are immune to electromagnetic interference.

Typically such delays have been accomplished by sending the signal through a loop in an optical waveguide on a single chip or a loop of optical fiber, with the loop a sufficient length to provide the desired time delay using the natural propagation delay of the signal in the optical waveguide. The delay loop in integrated circuits in the prior art is fabricated on the same chip of substrate as the optical switches. An example of this method is disclosed by Yap et al. in U.S. Pat. No. 5,222,162 which includes multiple taps for the single level delay line. An example of a multiple level single chip optical delay line circuit is found in Ser. No. 08/404,070 filed Mar. 14, 1995, now abandoned, by Jerry Leonard and assigned to Texas Instruments Inc.

SUMMARY OF THE INVENTION

In accordance with the present invention, a circuit architecture is provided whereby a time delay for optical signals in an integrated optical circuit is implemented in a hybrid configuration. For example, a hybrid time delay circuit could be implemented with a 3 chip set composed of two delay chips, one on either side of a switch chip. The delay chips may include one or more delay loops and preferably an associated bypass loop for each delay loop. The switch chip contains optical switches to route the optical signal to successive delay loops on the delay chips in an alternating fashion. The switch chip may also contain switch control circuitry or an interface to external switch control circuitry to control the length of the delay at a given time.

The use of the present invention can allow the separation of the switch and delay functions to separate chips. This allows processes to be optimized for the individual chip functions. Separation also allows for larger delay loops to be fabricated on the delay loop chip than would be possible in a single chip design. Separation of the switch and delay chips also increases yield for the chips, due to the smaller size the chips are less affected by process variations across the wafer and are less likely to have defects. This is apparently the first time delays for optical signals in an integrated optical circuit has been implemented in a hybrid configuration to gain the advantages discussed above.

In a first preferred embodiment, the hybrid circuit is a three chip set composed of a switch chip and two delay chips, with one delay chip located on either side of the switch chip. The delay chips include one or more delay loops and preferably an associated bypass loop for each delay loop. The switch chip contains an optical switch for each delay loop on the delay chips and may contain switch control circuitry or an interface to external switch control.

Alternatively, in another embodiment, the hybrid circuit is a two chip set composed of one delay chip and a switch chip. The delay chip includes one or more delay loops and preferably an associated bypass loop for each delay loop. The switch chip contains an optical switch for each delay loop on the delay chips and may contain switch control circuitry or an interface to external switch control.

Each of the embodiments may contain one or more delay loops off the chip in a loop of optical fiber to provide long delays that may be more feasible or economical to implement off chip than on the chip because of insertion loss and chip size considerations.

BRIEF DESCRIPTION OF THE DRAWINGS

The novel features believed characteristic of the invention are set forth in the appended claims. The invention itself, as well as other features and advantages thereof, will be best understood by reference to the detailed description which follows, read in conjunction with the accompanying drawings, wherein:

DETAILED DESCRIPTION OF THE DISCLOSURE

Figure 1:
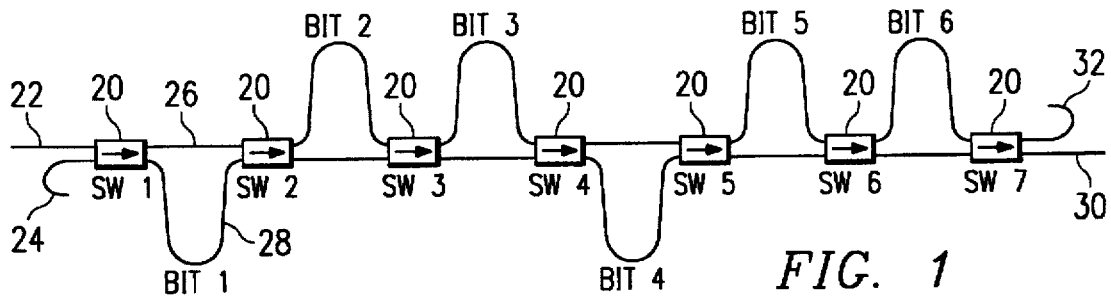
FIG. 1 illustrates a schematic representation of an optical circuit which can be implemented with a preferred embodiment of the present invention.

FIG. 1 illustrates a typical schematic representation of a series delay line circuit from the prior art which can be implemented with a preferred embodiment of the present invention. The circuit consists of a series of optical switches 20 connected with optical waveguides. Each optical switch 20 has two possible inputs which can be directed to one of two outputs. An optical signal is introduced to the circuit at an input to switch 1 (SW1) preferably from an input optical fiber 22.

The circuit of FIG. 1 provides a variable delay from the input signal 22 to the output signal 30 which can be used to provide an optical time delay network for systems such as phased array radars or optical data communication systems. The variable delay is produced by controlling each switch individually to send the input signal through the bypass or delay line of each switch. In FIG. 1, a short straight line interconnecting two successive switches represents a minimum length bypass, and a longer looping line represents a delay path. Each switch corresponds to a "bit" of the circuit where the delay for each bit is preferably chosen to be unique. The differential delay in bit "k", which is the difference in the delay of the signal from the delay path associated with bit "k" and the delay through that bit's bypass path, is preferably described by:

$$\text{Differential delay in Bit "k"} = 2^k \times \text{LSB (Least Significant Bit)}.$$

Where the LSB is chosen by such factors as the total system delay needed and resolution considerations. By choosing the delays according to this manner, a delay signal can be produced with the circuit which is an integer multiple of the LSB from zero to $2^N-1$, where N is the number of bits in the circuit and zero delay is the minimum delay corresponding to a path through all the bypass paths. Delay network architectures other than this binary configuration are possible, some possibilities are discussed at the end of this description of preferred embodiments.

Figure 2:
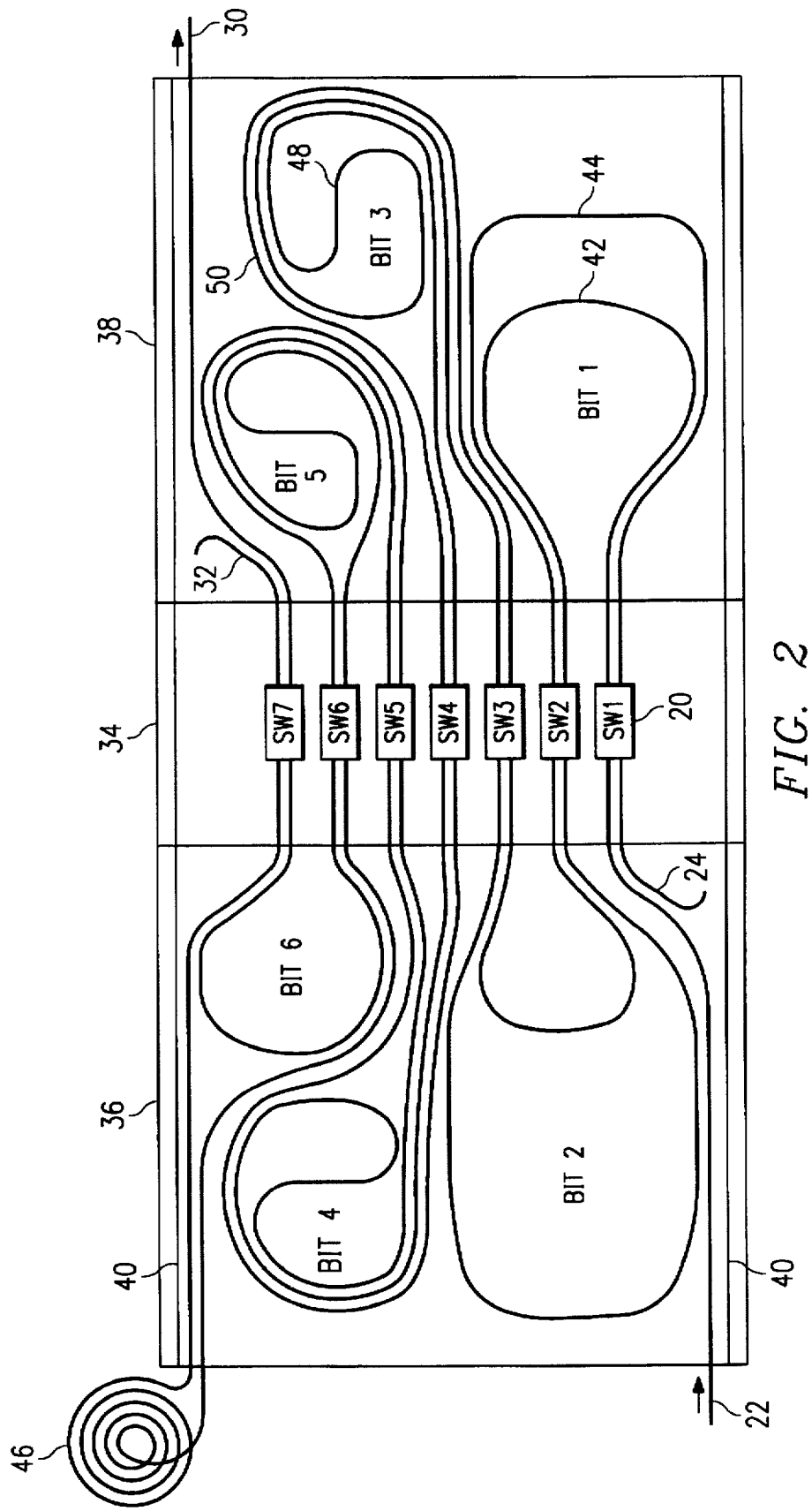
FIG. 2 illustrates a top view of the preferred embodiment using the circuit represented in FIG. 1 in a three chip set.

A preferred embodiment shown in FIG. 2 is an optical time delay network which uses the present invention to implement an optical delay circuit such as that shown in FIG. 1. This embodiment comprises a switch chip 34 disposed between two delay chips 36, 38. The delay chips 36, 38 contain the optical channel waveguide bypass loops and delay loops for each bit of the circuit as discussed above. The switch chip has waveguide cores that are aligned to corresponding waveguide cores on the delay chips 36, 38.

An optical signal is introduced to the circuit at the input to switch SW1 preferably from an input optical fiber 22. Optical fiber 22 is aligned and attached to the delay chip 36 using one of various methods known in the prior art such as disclosed in U.S. Pat. No. 5,309,537 to Chun et. al. (and incorporated herein by reference); Akio Sugita et. al. "Optical Fiber Coupling to Single-Mode Silica Based Planar Lightwave Circuits with Fiber-Guiding Grooves," Fiber and Integrated Optics, vol. 12, pp. 347–354; or Murphy, Edmund J., "Fiber Attachment for Guided Wave Devices," J. Lightwave Technol. Vol. 6 pp. 862–871 (1988).

In FIG. 2, the second input 24 to SW1 is not used. A lossy termination for this input may be accomplished by incorporating a waveguide section on the delay chip or the switch chip which is tightly curved or absorbing. Switch SW1 directs the optical signal from the input optical fiber 22 to bit 1 bypass line 42 or bit 1 delay line 44 to implement bit 1 of the delay circuit. The two outputs from SW1, after passing through the bypass line 42 or delay line 44, serve as the two inputs to SW2. In the same manner switches SW2–SW7 are connected in series to implement bits 2 through 6. One of the outputs of the final switch in the series is used as the circuit output to connect to the output fiber 30, while the other output 32 is unused and may be terminated as discussed above.

The embodiment of FIG. 2 illustrates an off chip fiber loop 46 as an optional feature of the present invention. This feature allows an exceptionally long delay to be implemented with a fiber loop rather than using a large amount of area on the chip. For delay lengths where the fiber to chip coupling loss would be less than the propagation losses within an on-chip delay path, total optical insertion loss could be minimized by using off-chip fiber delays.

Figure 3:
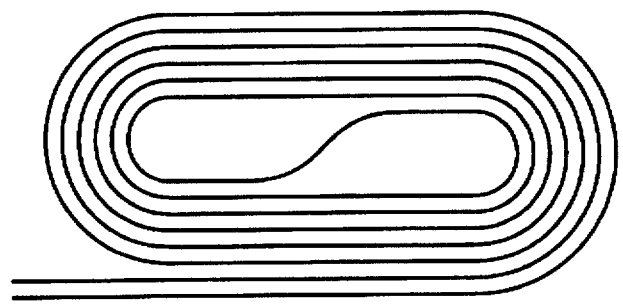
FIG. 3 shows a "racetrack" type loop.

The different delay loops in FIG. 2 accomplish a differential delay using different topographies. Bit 1 illustrates the use of a "trombone" type of topography where the delay bit 44 is merely a larger loop than the bypass loop 42. This topography is also used for Bit 2. Bits 3, 4, and 5 use a "racetrack" topography. In FIG. 2, bit 3 has a delay line 48 which uses the racetrack topography. A bypass line 50 for the racetrack topography typically encircles the racetrack delay line to minimize space while using a larger mining radius. FIG. 3 illustrates an enlarged view of the racetrack topography and how multiple spirals inward can be used prior to spiraling the waveguide back out in order to avoid lossy waveguide crossings. This technique is known in the art and has been used to make fairly long waveguides with minimal area. For example, see S. Suzuki et. al., Large-Scale and High-Density Planar Lightwave Circuits with High-Δ $GeO_2$-Doped Silica Waveguides, Elec. Lett., Vol. 28 No. 20, pp. 1863–64, Sep. 24, 1992.

Figure 4:
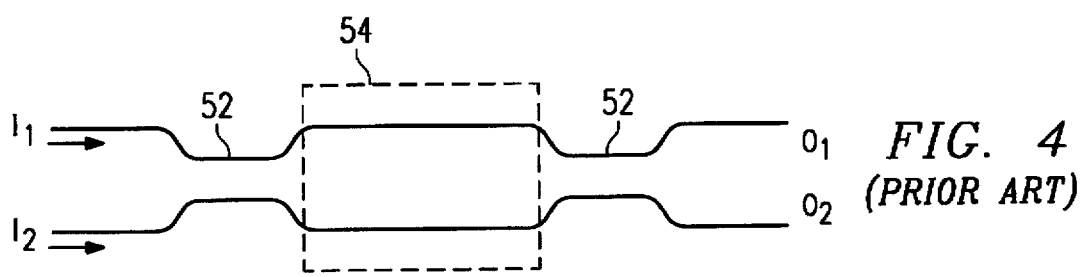
FIG. 4 shows a schematic representation of a Mach-Zehnder interferometer switching device.

FIG. 4 illustrates a Mach-Zehnder interferometer which can be used to implement the switches SW1–SW7 shown in FIG. 2. In the Mach-Zehnder device, incoming signals on the two inputs $I_1$ and $I_2$ are split by the 3 dB coupler 52 into the two waveguides in the interferometric region 54. A phase modulator is placed in one or both of the waveguides in this interferometric region. The two waveguide arms in the interferometer region are separated to eliminate coupling between them. Parameters are chosen such that for an input at $I_1$ the light arrives at the output of the upper waveguide $O_1$. However, by introducing a π phase shift in the interferometer region the light incident in $I_1$ would then exit from the lower output waveguide $O_2$. The result is a 2×2 switch for which both states can be achieved.

Figure 5A:
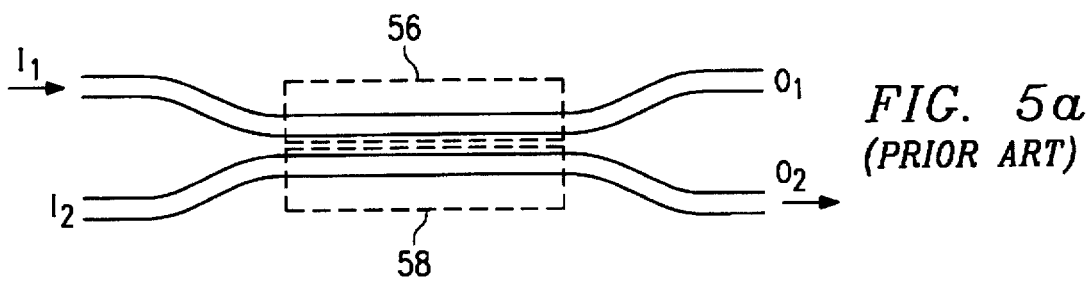
FIG. 5 represents a directional coupler type switch actuated by a micro-mechanical membrane.
Figure 5B:
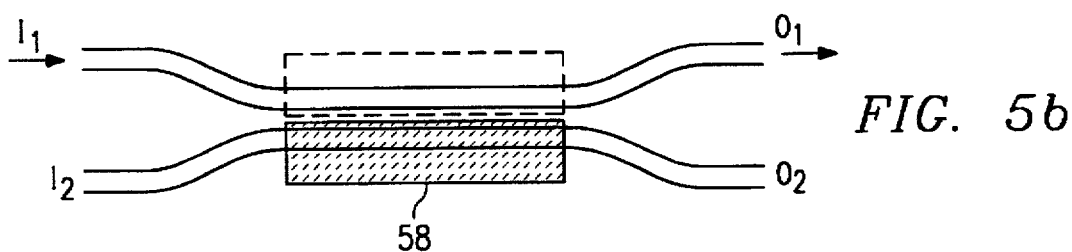

The switches SW1–SW7 could also be implemented with directional coupler type membrane switches as disclosed in U.S. Pat. No. 5,278,925 and 5,178,728 filed Apr. 4, 1993, issued to Boysel et al. and incorporated herein by reference. FIG. 5a shows such a switch having two parallel channels with membranes 56, and 58 over the two channels such that neither membrane is activated. In this state, the coupler can be designed so that light entering the upper waveguide $I_1$ will exit the lower waveguide $O_2$ as shown. FIG. 5b represents the activated state, where the membrane 58 over the lower channel of the directional coupler switch is activated to create a phase shift in the light signal traveling in the waveguide under the membrane. This phase shift desynchronizes the coupler, preventing cross coupling. The result for the activated state is the light signal will exit from the upper waveguide $O_1$ as shown in FIG. 5b.

Figure 6:
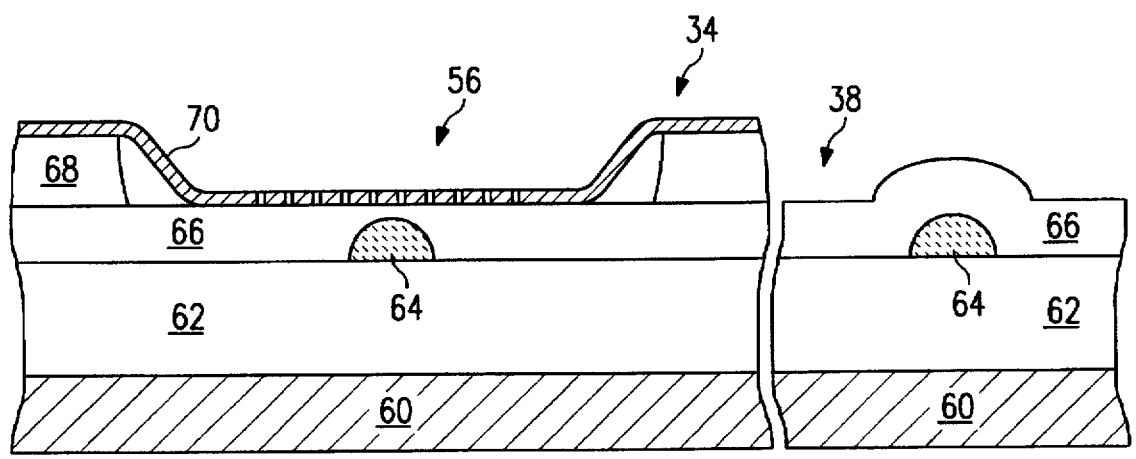
FIG. 6 shows a cross-sectional view of a switch chip and a delay chip.

To illustrate an advantage of the present invention, FIG. 6 shows a cross-sectional view of a portion of a delay line chip 38 next to a cross-sectional view of a switch chip 34, having a micromechanical membrane area 56. Each of the two chips have a substrate layer 60 with a lower cladding 62 and an upper cladding 66 surrounding a waveguide core 64. The switch chip 34 has the upper cladding 66 thinned in the area of the micromechanical membrane 56 so that when the switch is activated (as shown) the metal membrane layer 70 will be in close proximity to the waveguide core 64. In contrast, it is desirable to maintain the upper cladding layer 66 on the delay chip 38 thick to minimize signal losses in the delay chip waveguides. It is also unnecessary to planarize the delay chip 38, thus the "bumps" in the upper cladding 66 resulting from the fabrication process need not be removed. Therefore, with the present invention, the separation of the switch and delay functions allows the upper cladding layers for the delay lines and the switches to be fabricated independently.

Figure 7:
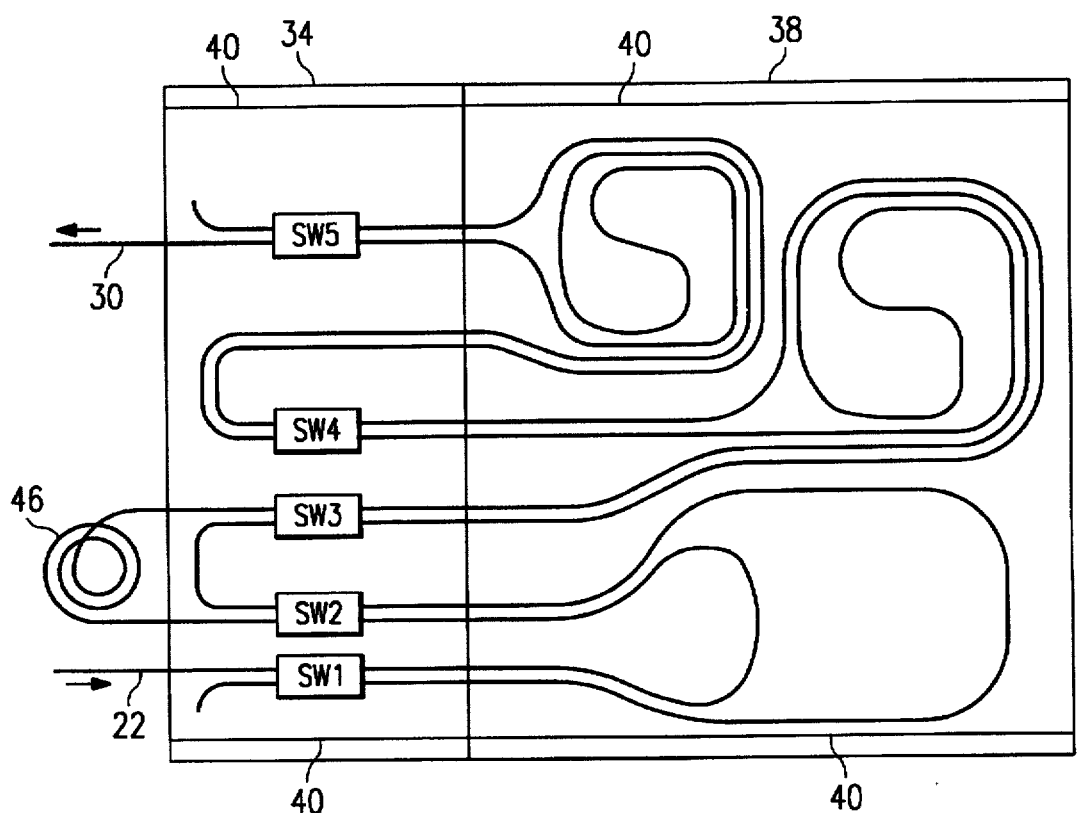
FIG. 7 shows a top view of an embodiment implementing a circuit similar to that represented in FIG. 1 in a two chip set.

A butt joint connection of a delay chip 36 and a switch chip 34 is used to connect the chips in the configurations shown in FIGS. 2 and 7. An example of a method to connect the chips is described in Watson et al., J. Lightwave Technol., Vol. 8, No. 5, pp. 794–801 (1990).

Preferably, figment waveguides 40 illustrated in FIGS. 2 and 7 are included on each of the chips to facilitate alignment of the chips. This can be helpful to determine if alignment is proper by passing a signal through the alignment waveguides during connection and maximizing the signal. This is particularly helpful because there are no switches on these waveguides that may require activation to propagate the alignment signal.

In reference to FIG. 2, switches SW1–SW7 are shown evenly spaced along the width of the chip. In a preferred embodiment, these switches are grouped in the center of switch chip 34, rather than spaced as shown. This tight spacing provides a shorter interface length between the two chips for which the quality and tolerances of the interfaces and accuracy of the waveguide spacing must be maintained. A shorter effective interface increases production yields for the polishing and attachment steps of production.

The sole Table, below, provides an overview of some embodiments and the drawings.

TABLE

| Element | Specific Example | Alternatives |
| --- | --- | --- |
| 20 | Optical Switch | Mach-Zehnder or Directional Coupler Type Micromechanical Switch Electro-optic Switch |
| 22 | Input Waveguide, Fiber or Signal Path | |
| 24 | Unused Input | |
| 26, 42, 50 | Bypass Loop | |
| 28, 44, 48 | Delay Loop | |
| 30 | Output Waveguide, Fiber or Signal Path | |
| 32 | Unused Output | |
| 34 | Switch Chip | |
| 36, 38 | Delay Loop Chip | |
| 40 | Alignment Waveguide | |
| 42, 50 | Bypass Loop | |
| 46 | Fiber Delay Loop | |
| 52 | 3dB Coupler Region | |
| 54 | Interferometer Phase Shift Region | |
| 56, 58 | Micromechanical Membrane | |
| 60 | Substrate | |
| 62 | Lower Waveguide Cladding | |
| 66 | Upper Waveguide Cladding | |
| 64 | Waveguide Core | |
| 68 | Sacrificial Spacer | |
| 70 | Membrane Layer | |

While this invention has been described with reference to illustrative embodiments, this description is not intended to be construed in a limiting sense. In general the preferred or specific examples are preferred over the other alternate examples, however, it is to be understood that the scope of the invention also comprehends embodiments different from those described, yet within the scope of the claims. It is therefore intended that the appended claims encompass any such modifications or embodiments.

In particular, implementation of the method of this invention is contemplated in discrete components or fully integrated circuits in silicon, germanium, gallium arsenide, or other electronic material families. Optical waveguides for delay lines or switches may be made in silicon dioxide, silicon nitride, lithium niobate or optical polymers. The method also contemplates multiple layers of optical waveguide even though the embodiments illustrated are limited to one layer. Also, switches used in the embodiment may be different types of optical switches such as $LiNbO_3$ electro-optic switches. The present invention also contemplates using any number of fiber delay lines in addition to some on chip delay lines. In addition, the shape of the delay loops or paths for the delay lines can be varied to be spirals, ovals, concentric circles or variations or combinations of these shapes. Another preferred embodiment contemplated by the present invention, shown in FIG. 7, is an embodiment similar to FIG. 2 but with only a single delay chip and a switch chip.

The preferred embodiments above were described for a binary type system where the switches have at most two inputs and outputs. Other configurations could use the methods of the present invention using switches with other input and output variations. For example, in general n×m switch networks consisting of a number of multiple input and output switches having more than two delay paths between the switches could be used. In this manner, a delay system having a base m other than two could be implemented with the present invention, where there are m delay and bypass paths in each stage. In such a system, a delay system with N stages could achieve $m^N$ delay states.

What is claimed is:

1. A hybrid integrated optical time delay circuit comprising:
   (a) a first delay loop chip containing at least one delay loop and at least one bypass loop;
   (b) a second delay loop chip containing at least one delay loop and at least one bypass loop; and
   (c) a switch chip disposed between said first and second delay loop chips containing at least one switch; and
   (d) means for coupling optical signals from said first and second delay loop chips to said switch;
   wherein an optical signal can be switched between said delay loops to provide an variable delay.

2. The optical time delay circuit of claim 1, wherein said delay and bypass loops in said first and second delay loop chips comprise phosphosilicate glass waveguide cores covered with $SiO_2$ cladding.

3. The optical time delay circuit of claim 1, wherein at least one of said delay loops of said first and second delay loop chips includes at least one off-chip fiber optic loop.

4. The optical time delay circuit of claim 1, wherein the switches are 2×2 optical switches.

5. The optical time delay circuit of claim 1, wherein said switches further comprise multiple switch networks consisting of 2×2 optical switch elements.

6. A hybrid integrated optical time delay circuit comprising:
   (a) a delay loop chip containing at least one delay loop and at least one bypass loop;
   (b) a switch chip placed adjacent to the delay loop chip containing at least one switch; and
   (c) means for coupling optical signals from delay loop chip to the switches;
   wherein an optical signal can be switched between said delay loops to provide an variable delay.

7. The optical time delay circuit of claim 6, wherein said delay and bypass loops in said delay loop chip comprise phosphosilicate glass waveguide cores covered with $SiO_2$ cladding.

8. The optical time delay circuit of claim 6, wherein at least one of said delay loops of said delay loop chip includes at least one off-chip fiber optic loop.

9. The optical time delay circuit of claim 6, wherein the switches are 2×2 optical switches.

10. The optical time delay circuit of claim 6, wherein said switches further comprise multiple switch networks consisting of 2×2 optical switch elements.

11. A method for fabricating a hybrid integrated optical time delay circuit comprising:
  (a) making at least one delay loop chip containing at least one delay loops and bypass loops;
  (b) making a switch chip containing at least one switch;
  (c) interfacing optical signals from said delay loop chip to said switches; and
  (c) interfacing at least one delay loop chip with a switch chip;
  wherein an optical signal can be switched between said delay loops to provide a variable delay.

12. The method of claim 11, wherein said delay chip is interfaced to said switch chip by butt joining at least one face of said delay loop chip and said switch chip.

13. The method of claim 11, wherein said delay and bypass loops in said delay loop chip comprise phosphosilicate glass waveguide cores covered with $SiO_2$ cladding.

14. The method of claim 11, wherein at least one of said delay loops of said delay loop chip includes at least one off-chip fiber optic loop.

15. The optical time delay circuit of claim 11, wherein the switches are 2×2 optical switches.

16. The optical time delay circuit of claim 11, wherein said switches further comprise multiple switch networks consisting of 2×2 optical switch elements.

* * * * *

UNITED STATES PATENT AND TRADEMARK OFFICE
CERTIFICATE OF CORRECTION

PATENT NO. : 5,701,372
DATED : 12/23/97
INVENTOR(S) : Gregory A. Magel, Robert M. Boysel It is certified that error appears in the above-indentified patent and that said Letters Patent is hereby corrected as shown below:

Column 1, line 5 under the title
"Hybrid Architecture for Integrated Optic Switchable Time Delay Lines and Method of Fabricating Same"
Add
--Notice: The U.S. Government has a paid-up license in this invention and the right in limited circumstances to require the patent owner to license others on reasonable terms as provided for by the terms of contract no. F30602-91-C-0008 awarded by U.S. Air Force Rome Laboratory, Griffiss Air Force Base, Rome, New York.--

Signed and Sealed this

Fifteenth Day of September, 1998

Attest:

BRUCE LEHMAN

*Attesting Officer*     *Commissioner of Patents and Trademarks*